(12) United States Patent
Stewart et al.

(10) Patent No.: US 12,045,262 B2
(45) Date of Patent: Jul. 23, 2024

(54) RECONCILIATION SYSTEMS AND METHODS FOR UNBOUNDED STREAMS

(71) Applicant: Discover Financial Services, Riverwoods, IL (US)

(72) Inventors: Duncan Stewart, London (GB); Alok Dwivedi, Reading (GB)

(73) Assignee: Discover Financial Services, Riverwoods, IL (US)

( * ) Notice: Subject to any disclaimer, the term of this patent is extended or adjusted under 35 U.S.C. 154(b) by 171 days.

(21) Appl. No.: 17/884,836

(22) Filed: Aug. 10, 2022

(65) Prior Publication Data
US 2024/0054484 A1    Feb. 15, 2024

(51) Int. Cl.
*G06F 16/00*    (2019.01)
*G06F 16/2455*    (2019.01)
*G06F 16/28*    (2019.01)

(52) U.S. Cl.
CPC ...... *G06F 16/285* (2019.01); *G06F 16/24568* (2019.01)

(58) Field of Classification Search
None
See application file for complete search history.

(56) References Cited

U.S. PATENT DOCUMENTS

| | | | |
|---|---|---|---|
| 9,619,545 B2 | 4/2017 | Hardy et al. | |
| 10,320,630 B2 * | 6/2019 | Gandham | G06F 16/2322 |
| 10,423,387 B2 * | 9/2019 | Johnson | G06F 16/2379 |
| 11,087,017 B1 * | 8/2021 | Mare | G06F 21/6218 |
| 11,394,778 B2 | 7/2022 | Vermeulen et al. | |
| 2017/0116210 A1 * | 4/2017 | Park | G06F 16/2433 |
| 2020/0177373 A1 | 6/2020 | Komandur et al. | |
| 2023/0009909 A1 * | 1/2023 | Porter | G06F 16/285 |

OTHER PUBLICATIONS

International Search Report and Written Opinion received for PCT Application Serial No. PCT/US2023/029911 mailed on Nov. 28, 2023, 12 pages.

\* cited by examiner

*Primary Examiner* — Anhtai V Tran
(74) *Attorney, Agent, or Firm* — Lee Sullivan Shea & Smith LLP

(57) ABSTRACT

A computing system is configured to (i) inject, into an unbounded stream of events produced by the computing system, a window open sentinel that indicates one or more reconciliation rules for the window, (ii) inject, into the unbounded stream of events, a shard open sentinel that indicates one or more reconciliation rules for a shard, wherein the shard is within the window, (iii) transmit a set of events produced within the shard, (iv) execute the reconciliation rules for the shard to thereby generate one or more reconciliation attributes for the shard, (v) inject, into the unbounded stream of events, a shard close sentinel that indicates the reconciliation attributes for the shard, (vi) execute the reconciliation rules for the window to thereby generate one or more reconciliation attributes for the window, and (vii) inject, into the unbounded stream of events, a window close sentinel that indicates the reconciliation attributes for the window.

20 Claims, 6 Drawing Sheets

RECONCILIATION SYSTEMS AND METHODS FOR UNBOUNDED STREAMS

BACKGROUND

Business organizations often rely on event-driven architectures to publish events that are subsequently consumed by unidentified downstream business applications. Business organizations may use such event-driven architectures to facilitate e-commerce transactions, social media websites, and the management of Internet of Things (IoT) devices. Many other uses of event-driven architectures are possible as well.

OVERVIEW

Disclosed herein is new technology for implementing a reconciliation framework in which a producer computing system may convert an unbounded stream of events into a series of bounded, self-reconcilable streams of events that can be consumed and reconciled by a consumer computing system.

In one aspect, the disclosed technology may take the form of a method to be carried out by a computing system that involves (i) determining a start of a window in an unbounded stream of events produced by the computing system, (ii) based on determining the start of the window, injecting, into the unbounded stream of events, a window open sentinel that indicates one or more reconciliation rules for the window, (iii) determining a start of a shard in the unbounded stream of events, wherein the shard is within the window, (iv) based on determining the start of the shard, injecting, into the unbounded stream of events, a shard open sentinel that indicates one or more reconciliation rules for the shard, (v) transmitting a set of events produced within the shard, (vi) executing the one or more reconciliation rules for the shard for a set of events produced within the shard to thereby generate one or more reconciliation attributes for the shard, (vii) determining a close of the shard in the unbounded stream of events, (viii) based on determining the close of the shard, injecting, into the unbounded stream of events, a shard close sentinel that indicates the one or more reconciliation attributes for the shard, (ix) executing the one or more reconciliation rules for the window for a set of events produced within the window to thereby generate one or more reconciliation attributes for the window, (x) determining a close of the window in the unbounded stream of events, and (xi) based on determining the close of the window, injecting, into the unbounded stream of events, a window close sentinel that indicates the one or more reconciliation attributes for the window.

In some example embodiments, the computing system is a producer computing system and the method may also involve receiving, from a consumer computing system, an indication that the shard was unsuccessfully reconciled and based on receiving the indication, retransmitting the set of events produced within the shard. Additionally, or alternatively, the method may also involve receiving, from a consumer computing system, an indication that the window was unsuccessfully reconciled, and based on receiving the indication, retransmitting the set of events produced within the window.

Further, in example embodiments, the one or more reconciliation rules for the window may include instructions for determining (i) a given number of events produced within the window, (ii) a given number of shards produced within the window, and (iii) a signature for each event produced within the window.

Further yet, in example embodiments, the one or more reconciliation rules for the window may include instructions for determining one or more of (i) a summation of a given event attribute across all events produced within the window, (ii) a number of a given type of event produced within the window, or (iii) a signature for each of a given type of event produced within the window.

Still further, in some example embodiments, the one or more reconciliation rules for the shard may include instructions for determining (i) a given number of events produced within the shard and (ii) a signature for each event produced within the shard.

Still further, in some example embodiments, the one or more reconciliation rules for the shard may include instructions for determining one or more of (i) a summation of a given event attribute across all events produced within the shard, (ii) a number of a given type of event produced within the shard, or (iii) a signature for each of a given type of event produced within the shard.

Still further, in some example embodiments, executing the one or more reconciliation rules for the shard for a set of events produced within the shard may involve executing the one or more reconciliation rules for the shard after all events in the set of events are produced within the shard.

Still further, in some example embodiments, executing the one or more reconciliation rules for the shard for a set of events produced within the shard may involve executing the one or more reconciliation rules for the shard after each event in the set of events is produced within the shard.

Still further, in some example embodiments, executing the one or more reconciliation rules for the window for a set of events produced within the window may involve executing the one or more reconciliation rules for the window after all events in the set of events are produced within the window.

Still further, in some example embodiments, executing the one or more reconciliation rules for the shard for a set of events produced within the window may involve executing the one or more reconciliation rules for the window after each event in the set of events is produced within the window.

Still further, in some example embodiments, the method may also involve determining the one or more reconciliation rules for the shard and/or the window.

Still further, in some example embodiments, one or more reconciliation rules for the window are different from the one or more reconciliation rules for the shard.

In yet another aspect, disclosed herein is a computing system that includes a network interface for communicating over at least one data network, at least one processor, at least one non-transitory computer-readable medium, and program instructions stored on the at least one non-transitory computer-readable medium that are executable by the at least one processor to cause the computing system to carry out the functions disclosed herein, including but not limited to the functions of one or both of the foregoing methods.

In still another aspect, disclosed herein is a non-transitory computer-readable medium provisioned with program instructions that, when executed by at least one processor, cause a computing system to carry out the functions disclosed herein, including but not limited to the functions of one or both of the foregoing methods.

Figure 1:
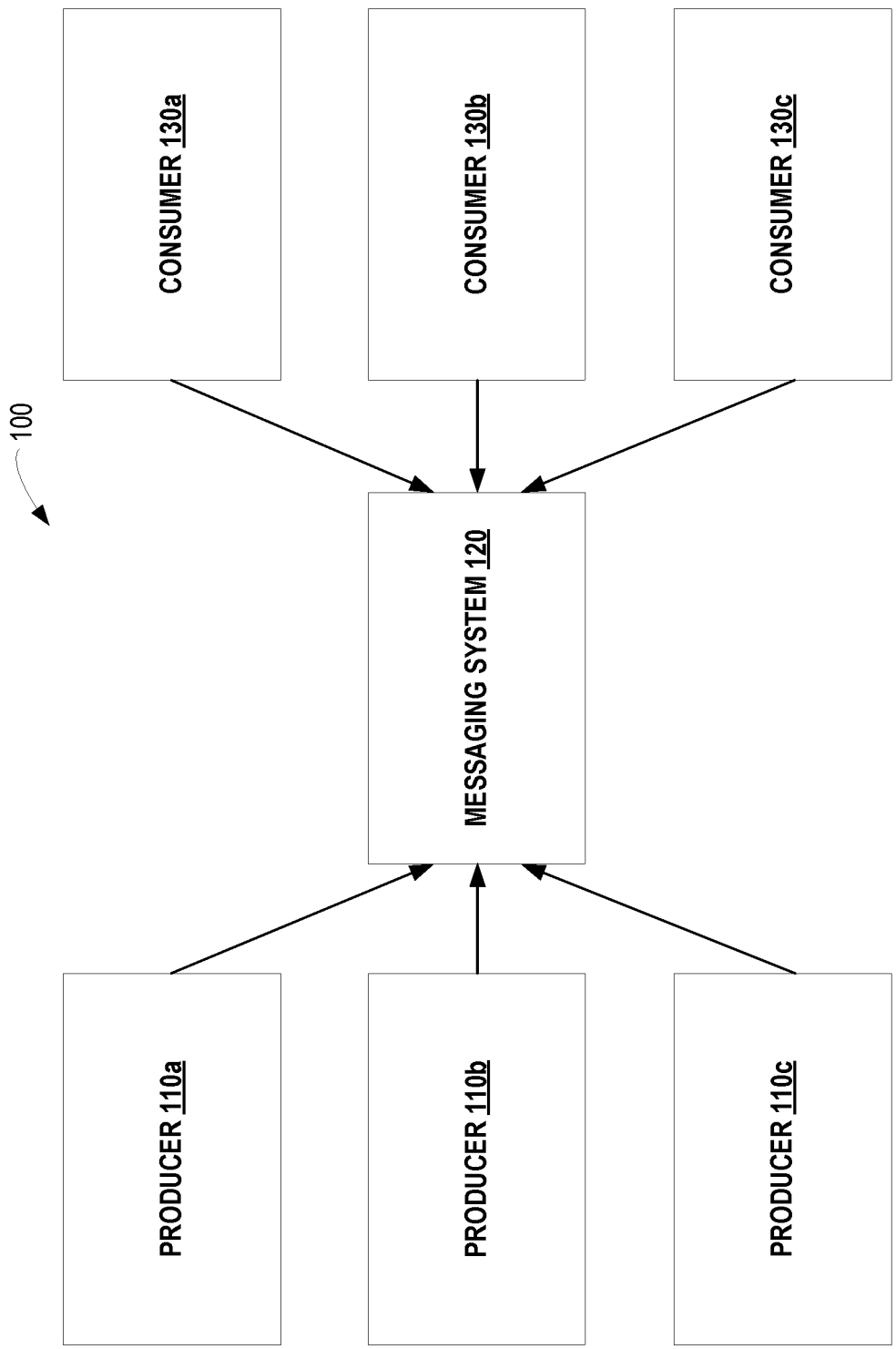
FIG. 1 depicts an example computing platform that employs an event-driven architecture.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

Disclosed herein is a new technology for converting an unbounded stream of events that may be generated in the context of an event-driven system architecture into a bounded, self-reconcilable stream of events. The disclosed technology may be carried out by any organization that engages in producing events, facilitating the delivery of events, and/or consuming events, examples of which include business organizations that facilitate e-commerce transactions, social media websites, and the management of Internet of Things (IoT) devices, among many other possibilities.

Business organizations such as these typically employ one or more computing platforms that include, at least in part, an event-driven architecture for producing, facilitating the delivery of, and consuming events. A typical event-driven architecture is made up of a collection of discrete software components, sometimes referred to as "services," each of which may carry out one or more functions within the event-driven architecture. These software components may be implemented using various different techniques. For example, the software components may be implemented in part using a microservices architecture where one or more of the software components are deployed in containers and communicate using respective APIs. As another example, one or more of the software components may utilize a serverless architecture where the given software component is implemented as a set of cloud-based functions that may only be run when another software component accesses its API. A computing platform implementing an event-driven architecture may integrate aspects of any of these various techniques, among others, in any combination.

The physical instantiation of the one or more software components discussed above may also take various forms. In this regard, it should be noted that the physical hardware (e.g., servers, processors, communication interfaces, etc.) that performs the functions within the event-driven-architecture might not be organized along the same logical lines as the associated software components. As one example, a given software component may be collectively implemented by two or more physically distinct computing systems within an overall computing platform. As another example, two or more logically separate software components (e.g., within separate containers or virtual machines) may be implemented using the same physical hardware. The software components may take other forms and may be implemented in other ways as well. Some of the structural components of the computing system(s) that might constitute an overall computing platform implementing an event-driven architecture are discussed further below in relation to FIG. 6.

The events that are produced and consumed in an event-driven architecture may take various forms, one of which may include a change in state in the computing platform that implements the event-driven architecture. As one example, if the event-driven architecture facilitates e-commerce transactions, an event may include a purchase order, a product availability inquiry, or an item return, among other possibilities. As another example, if the event-driven architecture facilitates social media interactions across a social media platform, an event may include a notification that a user has posted an update (e.g., a message, a photo, a reaction to another user's post, etc.). As yet another example, if the event-driven architecture facilitates the management of IoT devices, an event may include a temperature sensor reading from a network-connected thermostat or a proximity alert from a network-connect motion detector, among other possibilities.

As noted above, the discrete software components within an event-driven architecture may carry out various different functions. For instance, one or more of the discrete software components may generate events within the event-driven architecture. For purposes of the following discussion, the one or more software components (and the associated physical computing system(s)) that generate events within the event-driven architecture may generally be referred to as one or more "producers." A given producer within the event-driven architecture may take various forms. As one example in the context of an e-commerce platform, the given producer may take the form of a point-of-sale device, where the point-of-sale device generates an event for each sale or return. As another example, the given producer may take the form of a mobile application, where the mobile application generates an event in response to receiving an inquiry about the availability of an item for sale. As yet another example, the given producer may take the form of a retail web site, where the retail web site generates an event in response to a user placing a new order for an item. The given producer may take many other forms as well, depending on the application of the event-driven architecture.

Further, one or more of the discrete software components discussed above may consume the generated events within the event-driven architecture. In this regard, consuming an event may generally refer to receiving the event, and perhaps performing some processing associated with the event as well. For purposes of the following discussion, the one or more discrete software components (and associated physical computing system(s)) that consume events within the event-driven architecture may be referred to as one or more "consumers." A given consumer within the event-driven architecture may take various forms. As one example in the context of an e-commerce platform, the given consumer may take the form of a warehouse management database, where the warehouse management database may consume a produced sale event and in response, update its inventory and item availability records. As another example, the given consumer may take the form of a finance system, where the finance system may consume a produced sale event (e.g., the same sale event as the previous example) and in response, update financial records to reflect the sale. As yet another example, the given consumer may take the form of a customer relations system, where the customer relations system may consume an event corresponding to a question about availability of a particular item for sale and in response, generate a notification for a customer relations expert to respond to the inquiry. The given consumer may take many other forms as well, depending on the application of the event-driven architecture.

Further still, one or more of the discrete software components discussed above may facilitate (i) the delivery of events from the one or more producers to the one or more consumers and (ii) the delivery of one or more responses from the one or more consumers to the one or more producers. These software components may collectively form a messaging system through which events and responses can be sent. Such a messaging system may take various forms. As one possibility, the messaging system may take the form of an event broker that receives, stores, and delivers events from a producer to one or more consumers. As another possibility, the messaging system may take the form of an event router that receives events from a producer and routes them to one or more consumers. As yet another possibility, the messaging system may take the form of a messaging bus that receives produced events from a producer and delivers the produced events to one or more consumers that subscribe to the producer. The messaging system may take other forms as well.

Further, the messaging system may employ a variety of technologies to receive the events from a producer and deliver the events to a consumer. As one possibility, the messaging system may employ one or more queues, where the messaging system receives a produced event and places the received event in a queue that can be accessed by a consumer. As another possibility, the messaging system may employ one or more topics, where the messaging system applies additional metadata to the received event that facilitates the delivery of the event to consumers that have subscribed to the events corresponding to the topic. As yet another possibility, the messaging system may employ one or more logs, where the messaging system stores received events in a log that can be later accessed by a consumer. As still another possibility, the messaging system may employ streams, where the messaging system receives a produced event and makes the event available to the consumer in real time. The messaging system may employ other technologies as well.

Turning to FIG. 1, an illustrative example of a computing platform 100 implementing an event-driven architecture is shown. The event-driven architecture includes one or more event producers, illustrated by way of example as producer 110*a*, producer 110*b*, and producer 110*c*. The event-driven architecture also includes a messaging system 120 and one or more event consumers, illustrated by way of example as consumer 130*a*, consumer 130*b*, and consumer 130*c*. The event producers may be configured to produce events associated with the computing platform 100 and may take various forms. As one possibility, event producer 110*a* may be a point-of-sale system that is configured to produce payment transaction events each time an item is purchased. Accordingly, each event may be a data object that includes information about the payment transaction. For instance, each event may be organized according to a schema that defines certain data fields (e.g., a globally unique event identifier, a merchant identity, a payment amount, a transaction date, a transaction time, etc.) and corresponding values for the included data fields.

As another possibility, event producer 110*b* may be a customer service system that is configured to produce an event each time a dispute related to a payment transaction event is initiated (e.g., each time a business or customer disputes a transaction). Accordingly, each event may be a data object that includes information about the disputed transaction. For instance, a disputed transaction event may include a schema that may define different data fields (e.g., the disputed payment event's globally unique event identifier, a merchant identity, a disputed payment amount, etc.) and corresponding values for those data fields. The event producers, and the associated events they produce, may take many other forms as well.

Each of the producers shown in FIG. 1 may be configured to produce events and send them to the messaging system 120. In this respect, messaging system 120 may function to receive, store, and deliver the produced events. For instance, the messaging system 120 may receive the produced events via a respective communication link that connects the messaging system 120 with each producer. The communication links may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication link may be wireless, wired, or some combination thereof, and may carry data according to any of various different communication protocols. Messaging system 120 may receive the produced events from each of the producers in other ways as well.

Messaging system 120 may store the produced events in various ways. As one example, messaging system 120 may employ a data store, where messaging system 120 stores each event in the data store as it is received. In some implementations, when messaging system 120 delivers a produced event to one or more consumers that are designated to receive the event, messaging system 120 may purge the event from the data store. In some other implementations, messaging system 120 may employ an event log, where messaging system 120 logs each event in the event log as it is received. In such an implementation, when messaging system 120 delivers a produced event to a consumer 130, messaging system 120 retains the event in the event log. This may be beneficial in some situations, as it may allow the messaging system 120 to resend events if issues arise during delivery of the produced events. Messaging system 120 may store the produced events in other ways as well.

Messaging system 120 may deliver the produced events in various ways. As one example, messaging system 120 may be configured to push the produced events to appropriate consumers. For instance, one or more consumers may subscribe to a given type of produced event (e.g., payment transaction events). Thereafter, when messaging system 120 receives an event of the given type, messaging system 120 pushes the given event to consumer 130*a* and consumer 130*b*. As another example, messaging system may publish received events in an event stream, which may be accessed by one or more consumers to retrieve the events. Messaging system 120 may deliver the produced events in other ways as well.

Each of the consumers shown in FIG. 1 may be configured to consume produced events, which might include optionally performing one or more additional operations associated with the event, as noted above. As one example, consumer 130a may be a pricing system that is configured to consume payment transaction events (e.g., events related to purchases made using credit cards) that are produced by a point-of-sale system producer. Consumer 130a may consume the payment transaction events and calculate a price to levy on each respective transaction (e.g., to be charged to the issuer of the credit card). As another example, consumer 130b may be a dispute system that is configured to consume dispute events (e.g., events produced each time a business or customer disputes a transaction). Consumer 130b may consume the events and calculate a fee to be levied on the dispute event (e.g., fees to be refunded). The event consumers may take other forms as well.

It should be noted that, in the context of the computing platform 100 shown in FIG. 1 and other similar computing platforms that implement an event-driven architecture, there may not be a one-to-one correspondence between a producer and a consumer for each produced event. For instance, a single event that originates from a given producer might be consumer by two or more consumers. Similarly, a given consumer might consume events produced by many different producers, which may then be aggregated by the consumer before it carries out one or more operations on the aggregated event data. Various other examples are also possible.

In some implementations, the various software components within an event-driven architecture may produce and consume events in the form of an "unbounded" stream of events. An unbounded steam of events is a continuous stream of events with no defined beginning or end. In the context of an event-driven architecture, an unbounded stream of events means that producers can continuously produce events without temporal boundaries (e.g., the producers produce events as they occur, and the consumers consume events as they are received). In this regard, an unbounded stream of events can be useful for delivering data within a computing platform in real time, or close to real time.

Figure 2:
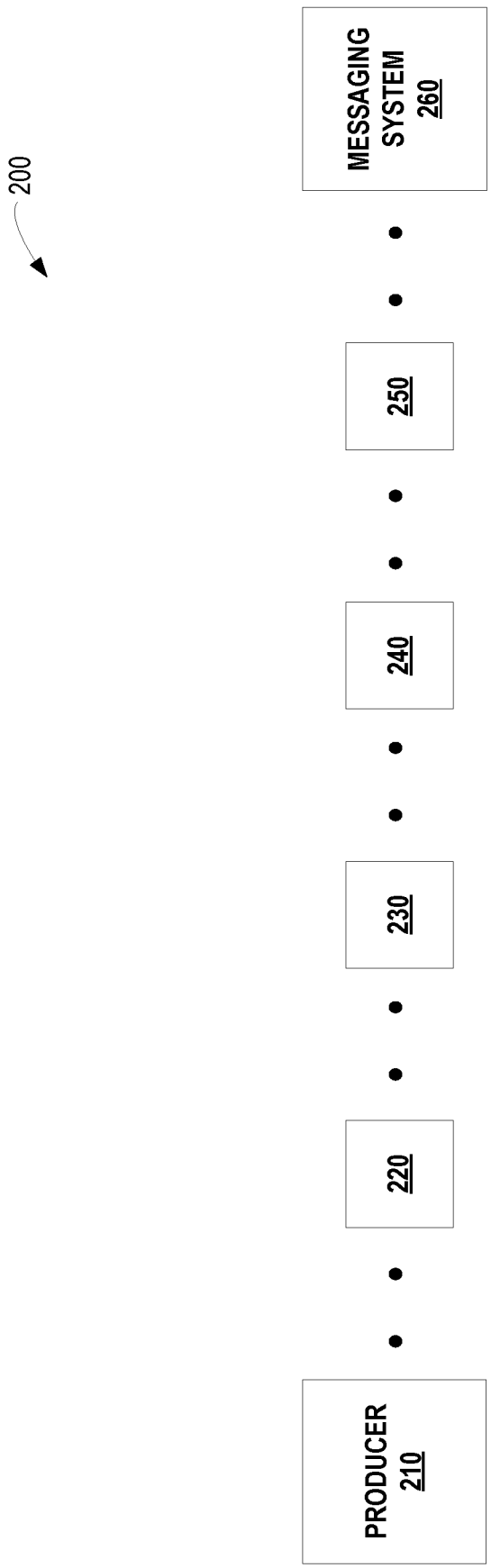
FIG. 2 depicts a schematic example of an unbounded stream of events within an event-driven architecture.

FIG. 2 shows one illustrative example of an unbounded stream of events within an event-driven architecture. In FIG. 2, a first software component associated with a first computing system, e.g., a producer 210, produces and sends events to a second software component associated with a second computing system, e.g., a messaging system 260, as part of an unbounded stream of events 200. In FIG. 2, event 220, event 230, event 240, and event 250 are depicted, however the unbounded stream of events 200 may additionally include events both preceding event 220 and following event 250. In some implementations, each event produced by producer 210 is immediately made available to messaging system 260, which in turn may make the events immediately available to one or more downstream consumers. In some other implementations, producer 210 may generate multiple events before making them available to the messaging system 260. In this regard, it should be understood that producer 210 may produce event 220, event 230, event 240, and event 250 at any time. For instance, the four events shown in FIG. 2 might be produced approximately every 15 seconds over the course of one minute, or they might be produced at random times over the course of one hour or an entire day. Other examples are also possible.

However, an unbounded stream of events in an event-driven architecture may be associated with various drawbacks. One potential drawback associated with unbounded streams of events is the difficulty in ensuring data reliability. For instance, because the events produced as part of an unbounded stream have no defined beginning or end, and can be produced at any time, it is difficult for a consumer to detect whether it is receiving every event that is produced. In some situations, an event that is produced by a producer may fail to reach the messaging system for any number of reasons (e.g., temporary network failure, third-party tampering). Similarly, an event may fail to be delivered from the messaging system to the consumer. In turn, this may expose the organization responsible for producing or consuming the event to operational or reputational risk.

For similar reasons, it also may be difficult to ensure data continuity of an unbounded stream of events. For instance, a consumer may have no way to detect whether additional, extraneous events have been injected into the stream, or whether a given, legitimate event has been ejected in favor of an illegitimate event that may be injected in its place.

Another potential drawback associated with unbounded streams of events in an event-driven architecture is the difficulty in ensuring data integrity—e.g., ensuring that the data within a received event has not been altered from the time the event was published by the producer. In this respect, an event may be exposed to tampering by a third-party after a producer generates the event. For instance, if a producer generates an event that is related to a financial transaction, a third-party may alter the values of the financial transaction at some point during intermediate processing or transit. As above, the consumer may have no way to detect such alterations, which may lead to the consumption and further processing of altered events.

The drawbacks described above may be particularly applicable when the computing platform that implements an unbounded stream to deliver events is operated by a financial services institution, as problems with data reliability, continuity, and/or integrity may directly affect the processing of payment transactions, the collection of fees, and/or customer satisfaction. For instance, altered financial transactions may constitute fraudulent activity that leads to economic losses for one or more entities involved (e.g., consumers, merchants, credit card issuers, etc.). Further, if an event is generated that pertains to a disputed transaction and that event is never delivered to the appropriate consumer, the disputed transaction may not be resolved promptly, or at all, which in turn may result in poor customer satisfaction and further economic losses.

For the reasons above, it may be advantageous to implement a framework that allows consumers to reconcile an unbounded stream of events from a producer in a way that improves a consumer's ability to verify reliable event delivery, continuity, and data integrity of the produced events. In this regard, "reconciliation" may refer to a process by which a consumer attempts to confirm both the number and identity of events it receives as well as certain attributes associated with the events.

However, implementing a reconciliation framework in the context of an unbounded stream of events is challenging for various reasons. As discussed above, unbounded streams of events are not bounded by time or restricted to a particular order and thus it is difficult for a consumer to verify that an event was produced in the first place (and thus, that the event should be expected). In addition, it is difficult for a consumer to verify when a consumed event was produced and/or delivered in relation to other events, as the events that are produced in an unbounded stream may become reordered during intermediate processing or transit. Still further, it is difficult for a consumer to verify whether the data within a received event is the same as the data that was produced by the producer. Accordingly, there is a need to implement a reconciliation framework that can be used to verify event delivery, reliability, and integrity of events in an unbounded stream.

In view of these shortcomings, a new technology is discussed herein for implementing a reconciliation framework in which a producer (e.g., a producer software component operating on a producer computing system) may convert an unbounded stream of events into a series of bounded, self-reconcilable streams of events that can be consumed and reconciled by a consumer (e.g., a consumer software component operating on a consumer computing system).

In accordance with one aspect of the producer computing system, a given producer may function to inject boundary markers into an unbounded stream of events. These boundary markers are also referred to herein as "sentinels" herein and serve to divide the unbounded stream into one or more units that may be reconciled (e.g., a unit of reconciliation, or UoR) by a consumer. For instance, an unbounded stream of events may be divided into one or more windows that contain a given number of events. Each window may be further sub-divided into one or more shards that contain a corresponding number of events from within the window, and so on.

At a high level, each sentinel that is injected into the unbounded stream of events by the producer may take the form of a data object that includes information signaling either the beginning (e.g., an "open" sentinel) or the end (e.g., a "close" sentinel) of a UoR. Further, the producer may include within each sentinel information that enables a consumer to perform reconciliation on the events within each UoR. The information in a given sentinel that enables reconciliation by a consumer may take various forms.

For example, in a given open sentinel (e.g., a window open sentinel or a shard open sentinel), the producer may include an identification of one or more reconciliation rules for the UoR that provide the basis for performing reconciliation on the events within the UoR. In general, the reconciliation rules of a given UoR may involve instructions for performing one or more operations associated with the events within the UoR, such as counting the number of events in the UoR or calculating a sum of the values within a given data field across all events in the UoR. Various other types of reconciliation rules are possible and will be discussed in further detail below.

After producing each of the events in the UoR, the producer may execute the one or more reconciliation rules indicated in the open sentinel and thereby generate one or more producer-generated reconciliation attributes. In turn, the producer may include these one or more producer-generated reconciliation attributes in the corresponding close sentinel (e.g., a window close sentinel or a shard close sentinel) for the UoR, which may be injected into the unbounded stream after all events in the UoR are produced.

From the consumer's perspective, the open sentinel provides an indication of the reconciliation rules that are to be used and the close sentinel includes an indication—in the form of the producer-generated reconciliation attributes—of the result that the consumer should obtain when executing the reconciliation rules. Accordingly, the consumer may execute the reconciliation rules in relation to the events it consumed within the UoR and thereby generate one or more consumer-generated reconciliation attributes. The consumer may then compare the consumer-generated reconciliation attributes with the producer-generated reconciliation attributes. If the attributes are the same, the consumer may determine that reconciliation of the UoR was successful. On the other hand, if one or more of the attributes differs, the consumer may determine that reconciliation was unsuccessful. Based on this determination, the consumer may transmit a request for the producer to re-send the events in the UoR (e.g., a replay request). Other examples are also possible and will discussed in further detail below.

Based on the foregoing, it will be appreciated that the reconciliation framework discussed herein results in an unbounded stream of events that is self-reconcilable based on information that is embedded in the stream itself. Accordingly, the producer may send the unbounded stream of events, including the injected sentinels, to a messaging system, which may deliver the stream to one or more consumers, without requiring any additional communications from the producer to the consumer(s) regarding the reconciliation of the stream (although the consumer may notify the producer of successful and/or unsuccessful reconciliation events, as discussed below). Further, any consumer of the stream may, after successful reconciliation of each UoR, become a producer of the same stream to further downstream consumers. In this regard, the events and data within the reproduced stream may be afforded the same level of trust as if the stream had come from the original producer.

Still further, the self-reconcilable nature of the unbounded stream allows for reconciliation to be performed at any and all points through which the stream passes within an event-driven architecture. For example, in some implementations, the messaging system of the event-driven architecture may perform reconciliation of the unbounded stream, even though the messaging system may not undertake any further processing associated with the events. Thereafter, if reconciliation of a UoR within the stream fails at the consumer, the consumer may send a replay request to the messaging system, rather than the producer. Other implementations are also possible.

Figure 3:
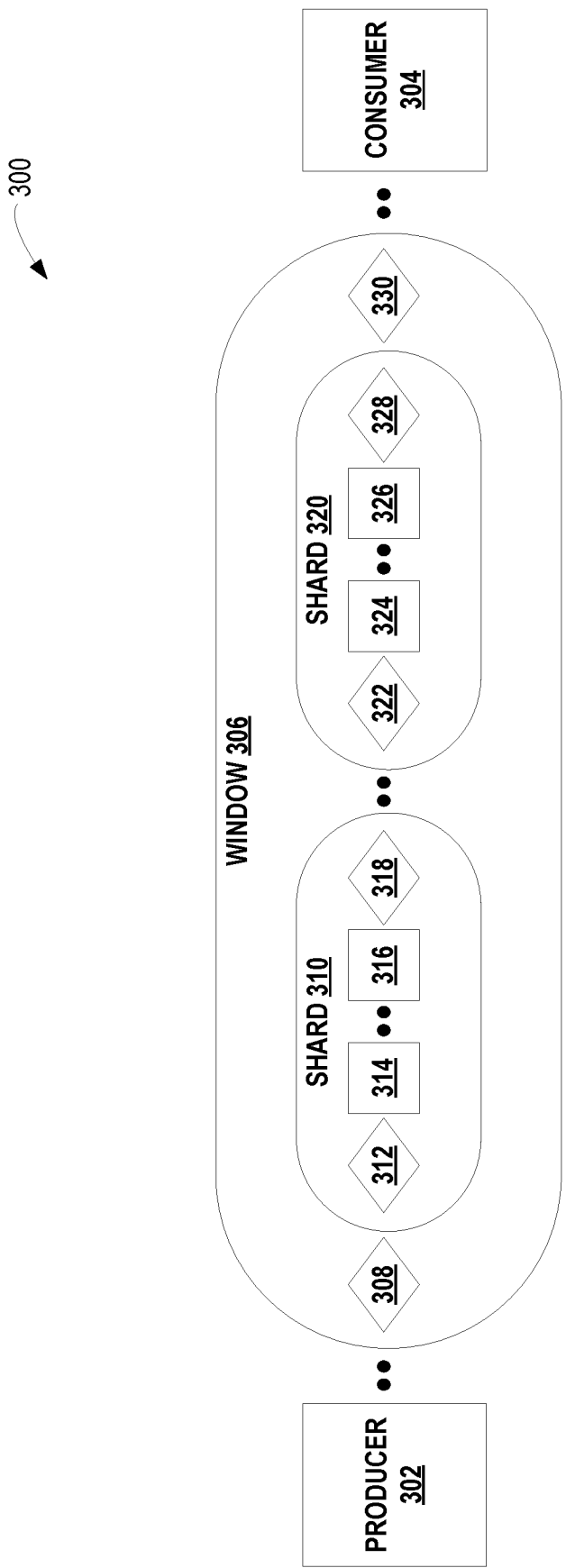
FIG. 3 depicts an example unit of reconciliation within an unbounded stream of events in accordance with the disclosed technology.

Turning now to FIG. 3, an illustrative example is depicted in which a portion of an unbounded stream of events may be converted into a series of bounded, self-reconcilable streams of events via the reconciliation framework described herein. As shown in FIG. 3, a first software component associated with a first computing system, e.g., a producer 302, produces and sends events that are eventually received by a second software component associated with a second computing system, e.g., a consumer 304, as part of an unbounded stream of events 300. In this regard, and consistent with the discussion above, it should be understood that the unbounded stream of events 300 shown by way of example in FIG. 3 may be handled by one or more additional intermediate software components between the producer 302 and the consumer 304, such as a messaging system that facilitates delivery of the events, as shown in FIG. 1 and FIG. 2. However, in the interest of focusing on the operations of the producer 302 and the consumer 304 within the disclosed reconciliation framework, the messaging system is not depicted in FIG. 3.

At a high level, the example in FIG. 3 shows four events—event 314, event 316, event 324 and event 326—that form a part of an unbounded stream of events 300, into which the producer 302 has injected several sentinels to divide the stream into self-reconcilable units. In particular, the producer has injected a window open sentinel 308, marking the beginning of a window 306, and a window close sentinel 330, marking the close of the window 306. Further, the producer has injected respective open and close sentinels for two shards—shard 310 and shard 320—that are sub-units of the window 306. Accordingly, each shard contains a sub-portion of the events within the window, e.g., two events each. In this regard, it should be understood that FIG. 3 represents just one simplified example and that in some other implementations, a given window might contain more or fewer shards that in turn might contain more or fewer events, and, among other possibilities.

Referring now to the window 306, the producer 302 may initially determine the start of the window 306 within the unbounded stream of events 300. Generally speaking, the producer 302 may determine the start of a new window following the end of a previous window in the unbounded stream. In turn, the producer 302 may determine the end of a given window in an unbounded stream based on various criteria, which will be discussed further below in relation to the window close sentinel 330.

Based on determining the start of window 306, the producer 302 may generate a window open sentinel 308 that includes information to facilitate the eventual reconciliation of the window 306 by one or more downstream consumers, such as the consumer 304. The information within the window open sentinel 308 to facilitate reconciliation may take various forms. For instance, the window open sentinel 308 may include metadata indicating a unique window identifier that the producer 302 may associate with each event that is produced within the window (e.g., by tagging the event with the window identifier). This may allow the consumer 304 to associate each received event with the correct window at the time of reconciliation.

The information within the window open sentinel 308 may additionally include an identification of one or more reconciliation rules for performing reconciliation of the events within the window 306. In this regard, the reconciliation rules may take the form of metadata the encodes instructions for performing one or more operations on the set of events that are included within the window 306. The reconciliation rules may take various forms and may be defined by the producer 302 based on one or more organization needs.

For example, one type of reconciliation rule may include an instruction to count the number of events that are included within the window 306. As noted above, the producer 302 may execute this rule after all the events within the window 306 are published and may include the resultant value (e.g., as part of one or more producer-generated reconciliation attributes) in the window close sentinel 330, as discussed further below. The consumer 304 may then use this value as the expected result when it executes the same rule for the events that it received in the window 306. If the value the consumer 304 obtains after executing the rule is the same as the expected result, the consumer 304 may determine that reconciliation according to the rule was successful. Another, similar type of reconciliation rule may include an instruction to count the number of shards that are included within the window 306.

Although the reconciliation rules discussed above may enable a consumer 304 to validate that it consumed the correct number of events within a given window, they might not necessarily enable the consumer 304 to validate that the identity of the events it consumed were all the same as the events that were produced by the producer 302. For example, it may be possible for an event within window 306 to be ejected from the unbounded stream of events 300 and replaced by a substitute event (e.g., by a third party). In these situations, reconciliation rules that only include counting the number of events or shards within the window may not identify the replaced event.

For this reason, the reconciliation rules may additionally or alternatively include an instruction to verify an event signature across all events in the window. In this regard, the events produced by the producer 302 may have a schema that includes a data field for a unique event identifier that may be used to generate an event signature. For instance, the reconciliation rule may include instructions for combining the unique event identifiers for each event using one or more cipher techniques. Accordingly, the value that results is based on each individual event identifier. In addition, the reconciliation rule may include instructions for generating a cryptographic hash of the resultant value using a hashing algorithm that is included as part of the reconciliation rule in the window open sentinel 308. The cryptographic hash of the resultant value may then be included in the window close sentinel 330 (e.g., as a producer-generated reconciliation attribute). Thus, the consumer 304 can recalculate the hashed value using the hashing algorithm in the window open sentinel 308, and then compare the resultant value to the value stored in the window close sentinel by the producer 302.

In some implementations, the producer 302 may define still further reconciliation rules that enable reconciliation of the events within the window 306 on a more granular level, such that the consumer 304 can validate the integrity of the information contained within the events. This may be useful in situations where it is desirable to prevent alterations to information within the events, where the alterations do not change the number or identity of the events within the window 306, and thus may not be detected by the reconciliation rules noted above. For instance, a given event might be altered by a third party to change the value of a payment transaction amount (e.g., from $50 to $500).

One example of this type of reconciliation rule may include instructions for aggregating (e.g., adding) the values from a given data field across all events within the window 306. For instance, the producer 302 may produce payment transaction events, and the reconciliation rule may include instructions for aggregating the value from a "Payment Amount" field for each respective event within the window 306. When the producer 302 executes the rule, the resultant value may be a total value (e.g., $30,000) that is included in the window close sentinel 330 (e.g., as a producer-generated reconciliation attribute). Accordingly, the consumer 304 can execute the same rule at the time of reconciliation and validate that the aggregated value it obtains is the same as the producer's, from which it may be inferred that none of the "Payment Amount" values from the events within the window were altered. An aggregation rule may also take other forms (e.g., a mean aggregation rule) and may be used on other data fields as well.

Another example of a more granular reconciliation rule may be a grouping rule that includes instructions for counting the occurrences of each unique value within a given data field across all events within the window 306. For instance, the reconciliation rule may include instructions for grouping the values within a "Merchant" field within the payment transaction events of the prior example. Within the window 306, there may be 100 total events including payment transactions that occurred at three different merchants (in this regard, the producer 302 might represent a computing system operated by an acquirer that handles payment transactions from multiple merchants). Accordingly, the producer 302 executes the reconciliation rule and generate resultant attributes indicating 30 transactions corresponding to the first merchant, 30 transactions corresponding to the second merchant, and 40 transactions corresponding to the third merchant. As above, these attributes may be included in the window close sentinel 330, enabling the consumer 304 to validate during reconciliation that the distribution of events among the consumers is correct. A grouping rule of this type may be applied to other data fields as well, such as a "Dispute Type" field in the context of a dispute resolution platform, among other possibilities.

Yet another example of a more granular reconciliation rule may involve instructions for generating a signature that incorporates the values from one or more data fields across all events within the window 306, similar to the event signature rule discussed above. For instance, referring again to the unbounded stream of payment transaction events discussed in the prior examples, the reconciliation rule may include instruction for (i) concatenating the values of the respective "Payment Amount" and "Merchant" fields into a single value for each event (e.g., in the form "Payment Amount Merchant" (ii) generating a cryptographic hash of the combined value for each event, using a hashing algorithm included in the window open sentinel 308, and (iii) combining the hashed values into a single hashed value using one or more cipher techniques. Similar to the examples above, the resultant value that the producer 302 generates when executing the reconciliation rule is dependent on every value, in both data fields, across all events in the window 306. Thus, the consumer's successful reconciliation of the window 306 may provide a strong indication that each of the values was unchanged. In this way, the producer 302 might define a signature rule that designates one or more data fields within the unbounded stream of events whose integrity is most important to validate during reconciliation. Other examples are also possible, including signature rules that involve more or fewer data fields.

The one or more reconciliation rules may take other forms as well.

As discussed throughout the examples above, the producer 302 may execute the one or more reconciliation rules included in the window open sentinel 308 after all of the events in the window 306 have been produced. In this regard, the producer might execute the reconciliation rules incrementally, updating a set of producer-generated reconciliation attributes after each and every event is produced. Alternatively, the producer 302 might execute the reconciliation rules for the entire window 306 after the last event (e.g., event 326) is produced. The producer 302 may execute the reconciliation rules at other times as well, including combinations of the above.

Regardless of when the producer 302 executes the reconciliation rules, it may include the resulting producer-generated reconciliation attributes in the window close sentinel 330. In line with the examples above, the producer-generated reconciliation attributes may include a set of values, with one or more of the values corresponding to each of the reconciliation rules that were executed by the producer 302. Each of these values, in turn, may represent an expected value that the consumer 304 may use as a reference to compare its own resultant values when executing the same reconciliation rules on the events that it consumed within the window.

In some implementations, the producer 302 might not include the producer-generated reconciliation attributes directly in the window close sentinel 330. Rather, the producer 302 may post the producer-generated reconciliation attributes to a secure registry or the like, and provide a link (e.g., a URI) or similar pointer in the window close sentinel that enables the consumer 304 to access the producer-generated reconciliation attributes. Other implementations are also possible for providing the consumer 304 with access to the producer-generated reconciliation attributes without including them directly in the window close sentinel 330.

It should be noted that, while one or more of the reconciliation rules above may be included in the window open sentinel 308 as discussed, it is also possible that the producer 302 and the consumer 304 may be configured to execute one or more of the above rules automatically, without reference to the window open sentinel 308. For instance, both the producer 302 and the consumer 304 may be configured to count the number of events within the window 306, and the window open sentinel 308 may lack any instruction for doing so. However, the producer 302 may still include the result of its execution of this automatic reconciliation rule in the window close sentinel 330, as a reference for the consumer 304 to use during reconciliation. The producer 302 and the consumer 304 may be preconfigured to execute any of the reconciliation rules discussed above in this way.

In some implementations, the producer 302 and the consumer 304 might exclusively execute reconciliation rules that they are already configured to execute, such that the window open sentinel 308 does not provide an indication of any additional reconciliation rules. In such an example, the open and close sentinels may nonetheless still provide for the division of the unbounded stream into reconcilable units, defining the boundaries for when the producer 302 and the consumer 304 should execute the pre-encoded reconciliation rules. Further, the window close sentinel 330 may still provide a vehicle for communicating the producer-generated reconciliation attributes to be used by the consumer 304.

In addition to an indication of the producer-generated reconciliation attributes, the window close sentinel 330 may include other information that may also facilitate reconciliation of the window 306. For instance, the window close sentinel 330 may include an indication of the unique identifier for the window 306 that the producer 302 included in the window open sentinel 308.

The producer 302 may determine when to generate the window close sentinel 330 in various ways. As one example, the producer 302 may be configured to inject a window close sentinel after a prescribed number of events has been produced, such as 100 events, after which the producer 302 will inject a new window open sentinel and start the count again. As another example, the producer 302 might be configured to produce windows based on a prescribed time period, such as every 30 seconds. Accordingly, the producer 302 may generate and inject a window close sentinel 30 seconds after a window open sentinel was injected, following by another window open sentinel.

Other examples are also possible, including combinations or variations of the above. For instance, in some situations, a producer 302 might produce events relatively slowly such that waiting for an event count to be met before sending a window close sentinel might undesirably delay reconciliation of some produced events. In these situations, the producer 302 might be configured to inject no window open sentinels into the stream until an event is produced, and then to inject a corresponding window close sentinel no later than 30 seconds (or some other time period) after the window open sentinel is injected. Various other possibilities also exist.

The consumer 304 may consume published events within the window 306 as they are received and may generally perform reconciliation based on the information received in the window open sentinel 308 and the window close sentinel 330 as discussed above. More specifically, at the start of each new window, the consumer 304 may generate a state object that corresponds to the window 306. For example, the state object may be associated with the unique identifier for the window 306. As the consumer 304 receives additional events corresponding to the window 306 (e.g., events tagged with the window identifier), the consumer 304 may add the events to the state object.

In this regard, and similar to the producer 302, the consumer 304 might execute the reconciliation rules indicated in the window open sentinel 308 as each new event in the window 306 is received, incrementally generating the consumer-generated reconciliation attributes that will be compared to the corresponding producer-generated information in the window close sentinel 330. In this way, the consumer 304 may be able to more quickly perform reconciliation when the window close sentinel 330 is received. Alternatively, the consumer 304 may wait to execute the reconciliation rules until after the window close sentinel 330 is received, and then do so all at once. Various combinations of the above are also possible.

In some implementations, due to the reordering of events that may occur during intermediate transit of the unbounded stream, the consumer 304 might receive an event that is tagged with a window identifier for which the consumer 304 has not yet received a window open sentinel. In this situation, the consumer 304 might determine that a new window has started and create a new state object with the associated window identifier, in anticipation of receiving the window open sentinel. In this regard, the consumer 304 may be unable to begin executing the reconciliation rules until they are received in the window open sentinel.

Similarly, the consumer 304 might also receive a window close sentinel before all events in the window have been received. For instance, the window close sentinel may include a producer-generated reconciliation attribute that indicates 100 events within the window, but the consumer 304 have only received 98 events. To account for these situations, the consumer 304 may be configured to include a tolerance, or expiry period, following the receipt of a window close sentinel to account for late arriving events. For instance, if a window is incomplete when the window close sentinel is received, the consumer 304 might wait an additional 10 seconds to allow the missing events to arrive before the consumer 304 determines that reconciliation of the window was unsuccessful.

In this regard, the consumer 304 may notify the producer 302 whether reconciliation of each window (and shard) was successful of unsuccessful. For instance, if the consumer 304 determines that the consumer-generated reconciliation attributes for the window 306 match the producer-generated reconciliation attributes for the window 306, the consumer 304 may notify the producer 302 that the reconciliation of the window 306 was successful. Conversely, if the consumer 304 determines that the consumer-generated and the producer-generated reconciliation attributes for the window 306 do not match, the consumer 304 may notify the producer 302 that reconciliation of the window 306 was unsuccessful, and that the events of the window should be replayed. This type of notification may be referred to herein as a replay event.

Turning to the shard 310 and the shard 320 shown in FIG. 3, the producer 302 may generally follow the same framework discussed above with respect to window 306 for generating and injecting shard open and shard close sentinels into the unbounded stream of events.

For example, shard 310 includes a shard open sentinel 312, which may include an identifier associated with shard 310. For instance, each shard within the window 306 may be assigned a shard identifier. In some cases, the shard identifier may take the form of an integer value that increases for each new shard within the window, although various other possibilities exist. Each event produced within the shard may be associated with the shard identifier (e.g., by tagging the event with the shard identifier). Accordingly, each event produced within the shard may include an indication of both a window identifier and a shard identifier. Further, the consumer 304 may use the shard identifier to sub-divide events that the consumer 304 stores within the window state object as they are received within the window 306.

Further, the shard open sentinel 312 may include an indication of one or more reconciliation rules for the shard 310. The reconciliation rules for the shard 310 may generally take the same form as the reconciliation rules discussed above with respect to the window 306. As above, the producer 302 may execute the shard reconciliation rules and thereby generate one or more producer-generated reconciliation attributes for the shard that will be included in the shard close sentinel 318.

In this regard, the producer 302 may define rules for reconciling, and the consumer 304 may reconcile, the unbounded stream of events at both the window level and the shard level, which may provide various benefits. At a high level, dividing the window 306 into smaller shards may allow for reconciliation to occur more frequently, which may allow for reconciliation errors to be recognized more quickly. This in turn may result in fewer events that need to be replayed. In addition, the producer 302 may define the granularity with which reconciliation is to be performed at each different level. As one possibility, the producer 302 may define shard reconciliation rules that validate the integrity of specific data fields within the unbounded stream of events, whereas the window reconciliation rules may be less granular, directly only to validating the number and identity of shards and events within the window. Alternatively, the producer 302 may define shard reconciliation rules that are less granular, and thus less computationally expensive, whereas the less frequently executed window reconciliation rules may be more granular. Other examples are also possible, and may be defined based on the business, security, and/or computational needs of the producer 302.

Similar to the window close sentinel 330, the shard close sentinel 318 may include the shard identifier associated with shard 310, as well as the one or more producer-generated reconciliation attributes for shard 310. Further, the producer 302 may determine when to inject the shard close sentinel 318 into the unbounded stream of events based on similar criteria as the window close sentinel. For instance, if the producer 302 is configured to produce a new window for every 100 produced events, the producer 302 may additionally be configured to sub-divide each window into shards that include 10 events each. Further, the producer 302 may define a similar relationship between windows and shards in a time-based rather than event-based reconciliation framework. Other examples are also possible.

The consumer 304 may perform reconciliation of the shard 310 substantially as discussed above with respect to window 306, by executing the reconciliation rules for the shard 310 and comparing the resulting consumer-generated reconciliation attributes for shard 310 with the producer-generated reconciliation attributes for shard 310 contained in the shard close sentinel 318. If reconciliation is unsuccessful, the consumer 304 may transmit a replay event for the shard 310 to the producer 302.

As mentioned above, it should be noted that although a messaging system is not shown in FIG. 3, there may be some implementations where an intermediate messaging system might perform reconciliation of the stream of events produced by the producer 302 before the events reach the consumer 304. In this regard, the messaging system might perform some or all of the operations discussed above with respect to the consumer 304.

Figure 4:
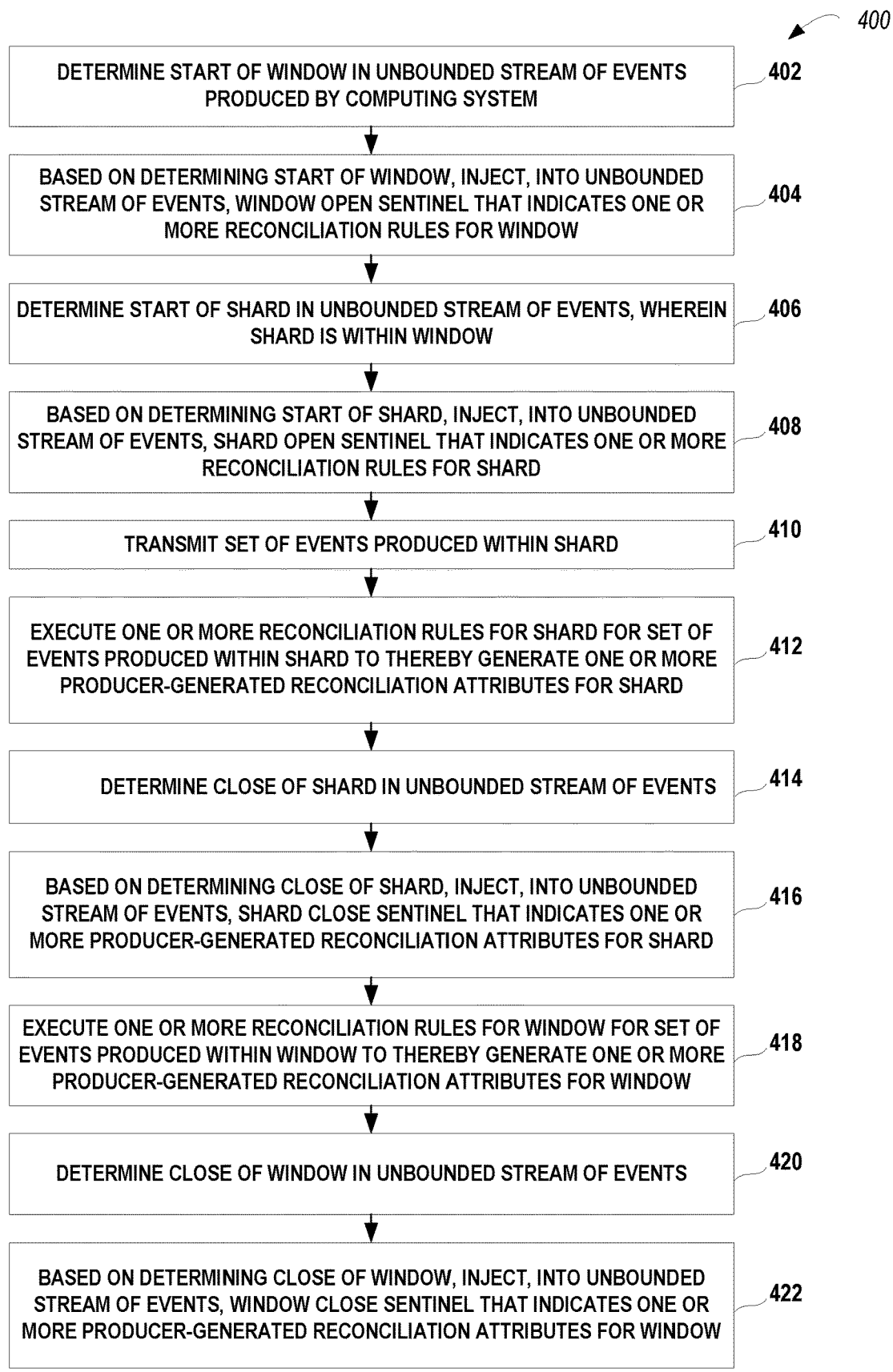
FIG. 4 depicts a flow diagram of an example process carried out by a producer computing system in accordance with the disclosed technology.

In accordance with the description above, FIG. 4 illustrates an example process 400 that may be carried out by a computing system, such as producer computing system the implements the producer 302 described above with respect to FIG. 3. Example process 400 may begin at block 402 with the producer 302 determining a start of a window (e.g., the window 306 described above with respect to FIG. 3) in an unbounded stream of events. As discussed above, the producer 302 may determine the start of the window 306 in various ways. As one possibility, the producer 302 may determine that no window is currently open (e.g., due to a prior window closing) and thus a new window should be opened. As another possibility, the producer 302 may determine that now window is open, but also that no events are being produced. Accordingly, the producer 302 may determine the start of a new window with it determines that a new event will be produced. Other examples are also possible.

Block 404 may involve, based on determining the start of the window, injecting a window open sentinel (e.g., the window open sentinel 308) into the unbounded stream of events that indicates one or more reconciliation rules for the window. The window open sentinel 308 may take various forms and may include various information. As one possibility, the window open sentinel 308 may include an identifier that serves to identify the window 306. As another possibility, the window open sentinel 308 may include an indication of one or more reconciliation rules for the window 306, which may take any of the forms discussed above.

Block 406 may involve determining a start of a shard (e.g., shard 310) in the unbounded stream of events, where the shard is within the window. The producer may determine the start of the shard 310 in various ways. As one possibility, the producer may determine that no shards are currently open within the window (e.g., either due to a window open sentinel being generated, or due to a prior shard closing).

Block 408 may involve, based on determining the start of the shard 310, injecting, into the unbounded stream of events, a shard open sentinel (e.g., shard open sentinel 312) that indicates one or more reconciliation rules for the shard 310. The shard open sentinel 312 may take various forms. As one possibility, the shard open sentinel 312 may include an identifier that serves to identify the shard 310. As another possibility, the shard open sentinel 312 may indicate one or more reconciliation rules for the shard 310, which may take any of the forms discussed above.

Block 410 may involve transmitting a set of events produced within the shard 310. The producer 302 may transmit the set of events produced within the shard 310 in various ways. As one possibility, the producer 302 may transmit the set of events produced within the shard to a messaging system that is configured to facilitate delivery of the set of events produced within the shard 310 to a consumer (e.g., consumer 304). The producer 302 may transmit the set of events produced within the shard 310 in other ways as well.

Block 412 may involve executing the one or more reconciliation rules for the shard 310 for a set of events produced within the shard (e.g., event 314 and event 316) to thereby generate one or more producer-generated reconciliation attributes for the shard 310. In this respect, the one or more producer-generated reconciliation attributes for the shard 310 may correspond to the one or more reconciliation rules for the shard 310. For instance, if the one or more reconciliation rules for the shard includes a rule to count the number of events produced within the shard 310, the resulting producer-generated reconciliation attribute may identify the number of the events in the shard 310 (e.g., 10 events). Further, the one or more producer-generated reconciliation attributes for the shard 310 may represent the expected result that the consumer 304 should obtain when executing the one or more reconciliation rules for the shard 310 when attempting reconciliation of the shard.

Further, the producer 302 may execute the one or more reconciliation rules for the shard at various times. As one possibility, the producer 302 may execute the one or more reconciliation rules for the shard 310 after the entire set of events are produced within the shard 310. As another possibility, the producer 302 may execute the one or more reconciliation rules for the shard 310 after each event in the set of events is produced within the shard 310. The producer 302 may execute the one or more reconciliation rules for the shard 310 at other times as well.

Block 414 may involve determining a close of the shard 310 in the unbounded stream of events. The producer 302 may determine the close of the shard in various ways. As one possibility, the producer 302 may determine that one or more conditions have been met, examples of which may include (i) determining that a target number of events have been produced within the shard 310 (e.g., 10 events) or (ii) determining that a given time interval has expired (e.g., thirty seconds, one minute, one hour, etc.). The producer 302 may determine the close of the shard 310 in other ways as well.

Block 416 may involve, based on determining the close of the shard 310, injecting, into the unbounded stream of events, a shard close sentinel (e.g., shard close sentinel 318) that indicates the one or more producer-generated reconciliation attributes for the shard 310 that were generated by the producer 302 executing the one or more reconciliation rules for the shard 310. The shard close sentinel 318 may take various forms and may include data such as (i) the shard identifier, and (ii) the one or more producer-generated reconciliation attributes for the shard. The shard close sentinel 318 may take other forms as well.

Block 418 may involve executing the one or more reconciliation rules for the window 306 for a set of events produced within the window (e.g., the events within shard 310 and shard 320) to thereby generate one or more producer-generated reconciliation attributes for the window 306. In this respect, the one or more producer-generated reconciliation attributes for the window 306 may correspond to the one or more reconciliation rules for the window. Further, the one or more producer-generated reconciliation attributes for the window may represent the expected result that consumer 304 should obtain when executing the one or more reconciliation rules for the window 306 when attempting reconciliation of the window 306.

Further, the producer 302 may execute the one or more reconciliation rules for the window 306 at various times. As one possibility, the producer 302 may execute the one or more reconciliation rules for the window 306 after the entire set of events are produced within the window 306. As another possibility, the producer 302 may execute the one or more reconciliation rules for the window 306 after each event in the set of events is produced within the window 306. The producer 302 may execute the one or more reconciliation rules for the window 306 at other times as well.

Block 420 may involve determining a close of the window 306 in the unbounded stream of events. The producer 302 may determine the close of the window 306 in various ways. As one possibility, the producer 302 may determine that one or more conditions have been met, examples of which may include (i) determining that a target number of events have been published within the window 306, (ii) determining that a target number of shards have been opened and closed within the window, or (iii) determining that a given time interval has expired. The producer 302 may determine the close of the window 306 in other ways as well.

Block 422 may involve, based on determining the close of the window 306, injecting, into the unbounded stream of events, a window close sentinel (e.g., window close sentinel 330) that indicates the one or more producer-generated reconciliation attributes for the window 306. The window close sentinel 330 may take various forms and may include data such as (i) the window identifier, and (ii) the one or more producer-generated reconciliation attributes for the window. The window close sentinel 330 may take other forms as well.

It should be understood that while the producer 302 is performing the functions above, one or more consumers 304 may be performing reconciliation on the window(s) or shard(s). In turn, if reconciliation of a given window or shard fails, the producer 302 may receive a request to resend the set of events produced within a given window or shard. In response to receiving such a request, the producer may "replay" the window or shard identified in the request by repeating one or more of the functions described above.

For example, a producer 302 may inject a shard open sentinel and a shard close sentinel in accordance with the description above. At some point in time after the producer 302 has injected the shard close sentinel (e.g., before or after the producer 302 has injected the window close sentinel), the producer 302 may receive an indication that reconciliation of the shard was unsuccessful. In response to receiving the indication, the producer 302 may replay the shard by reproducing the set of events for the shard (e.g., by retransmitting the events to a messaging system). In turn, one or more downstream consumer can reattempt reconciliation of the shard.

In some circumstances, the producer 302 may, in addition to replaying the shard, replay the entire window of which the replayed shard is a part. In this respect, the producer 302 may replay the window by reproducing the set of events for the entire window. In turn, a downstream consumer can reattempt reconciliation of the entire window of which the shard is a part.

Figure 5:
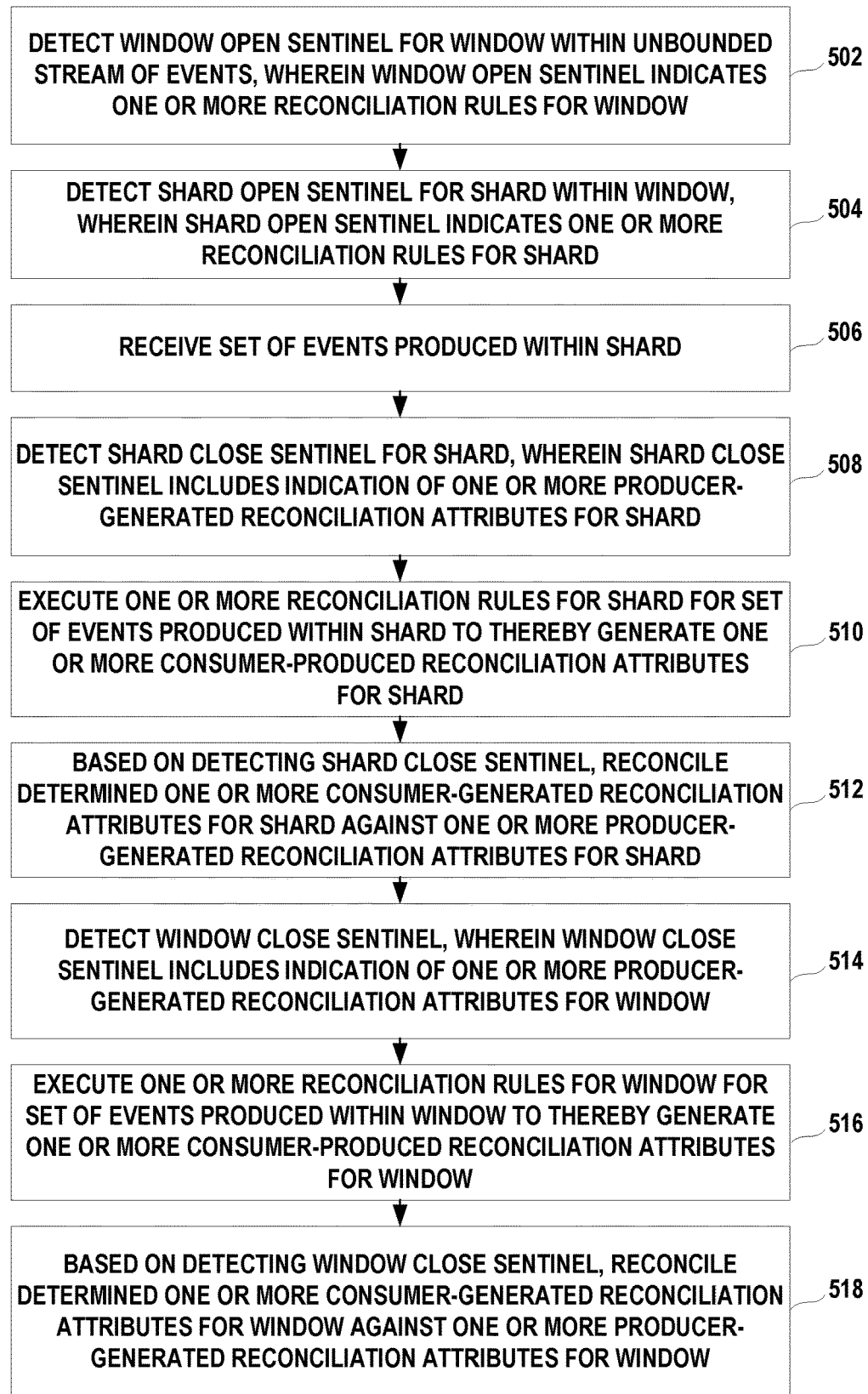
FIG. 5 depicts a flow diagram of an example process carried out by a consumer computing system in accordance with the disclosed technology.

In accordance with the description above, FIG. 5 illustrates an example process 500 that may be carried out by a computing system, such as consumer computing system the implements the consumer 304 described above with respect to FIG. 3. Example process 500 may begin at block 502 with the consumer 304 detecting a window open sentinel (e.g., window open sentinel 308) for a window (e.g., window 306 described above with respect to FIG. 3) within an unbounded stream of events, where the window open sentinel 308 indicates one or more reconciliation rules for the window 306. The consumer 304 may detect the window open sentinel 308 for the window 306 as a result of monitoring the unbounded stream of events for a window open sentinel, among other possibilities. The window open sentinel 308 may indicate a window identifier as well as one or more reconciliation rules for the window, which may take the form of any of the reconciliation rules discussed above.

Block 504 may involve detecting a shard open sentinel (e.g., shard open sentinel 312) for a shard (e.g., shard 310) within the window 306, where the shard open sentinel 312 indicates one or more reconciliation rules for the shard 310. As above, the reconciliation rules for the shard 310 may take the form of any of the reconciliation rules discussed above.

Block 506 may involve receiving a set of events produced within the shard 310. The consumer 304 may receive the set of events produced within the shard in various ways. As one possibility, the consumer may receive the set of events from a messaging system configured to facilitate the delivery of the set events produced within the shard 310 from the producer 302 to the consumer 304. In addition, the consumer 304 may store each event that is received within the shard in a state object that the consumer 304 created for the window 306.

Block 508 may involve detecting a shard close sentinel (e.g., shard close sentinel 318) for the shard 310, where the shard close sentinel 318 includes an indication of one or more producer-generated reconciliation attributes for the shard 310. For example, the consumer 304 may be configured to monitor the unbounded stream of events for the shard close sentinel 318. The consumer 304 may detect the shard close sentinel 318 in other ways as well.

Block 510 may involve executing the one or more reconciliation rules for the shard 310 for a set of events produced within the shard 310 to thereby generate one or more consumer-generated reconciliation attributes for the shard 310. In this respect, the one or more consumer-generated reconciliation attributes for the shard 310 may correspond to the one or more reconciliation rules for the shard 310. For instance, if the one or more reconciliation rules for the shard includes a rule to count the number of events produced within the shard 310, the corresponding consumer-generated reconciliation attribute may identify the number of the events in the shard 310. Once the one or more consumer-generated reconciliation attributes for the shard are generated, the consumer 304 may store each of the one or more consumer-generated reconciliation attributes for each event produced within the shard 310 in the data object for the shard 310.

Block 512 may involve, based on detecting the shard close sentinel 318, reconciling the determined one or more consumer-generated reconciliation attributes for the shard 310 against the one or more producer-generated reconciliation attributes for the shard 310. For example, the consumer 304 may compare the determined one or more consumer-generated reconciliation attributes for the shard 310 with the one or more producer-generated reconciliation attributes for the shard 310. In this respect, if the determined one or more consumer-generated reconciliation attributes for the shard 310 are different than the one or more producer-generated reconciliation attributes for the shard 310, the consumer 304 may determine that reconciliation of the shard was unsuccessful. Conversely, if the consumer 304 determines that the one or more consumer-generated reconciliation attributes for the shard 310 are the same as the one or more producer-generated reconciliation attributes for the shard 310, the consumer 304 may determine that the reconciliation of the shard 310 was successful.

Block 514 may involve detecting a window close sentinel (e.g., the window close sentinel 330), wherein the window close sentinel 330 includes an indication of one or more producer-generated reconciliation attributes for the window 306. For example, the consumer 304 may be configured to monitor the unbounded stream of events for the window close sentinel 330. The consumer 304 may detect the window close sentinel 330 in other ways as well.

Block 516 may involve executing the one or more reconciliation rules for the window 306 for a set of events produced within the window 306 to thereby generate one or more consumer-generated reconciliation attributes for the window 306. In this respect, the one or more consumer-generated reconciliation attributes for the window 306 may correspond to the one or more reconciliation rules for the window 306. For instance, if the one or more reconciliation rules for the window includes a rule to count the number of shards within the window 306, there may be a corresponding consumer-generated reconciliation attribute that identifies the number of the shards in the window 306. Once the one or more consumer-generated reconciliation attributes for the window 306 are generated, the consumer 304 may store the one or more consumer-generated reconciliation attributes for each event produced within the window in the state object for the window 306.

Block 518 may involve, based on detecting the window close sentinel 330, reconciling the determined one or more consumer-generated reconciliation attributes for the window 306 against the one or more producer-generated reconciliation attributes for the window 306. For example, the consumer 304 may compare the determined one or more consumer-generated reconciliation attributes for the window 306 with the one or more producer-generated reconciliation attributes for the window 306 to determine whether reconciliation of the window 306 is successful, as discussed above.

For the example process 400 of FIG. 4, the example processes 500 shown in FIG. 5, and other processes described herein, the flowcharts show functionality and operation of one possible implementation of embodiments disclosed herein. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the example processes 400 and 500, each block shown in FIG. 4 and FIG. 5 may represent circuitry that is wired to perform the specific logical functions in the process.

Figure 6:
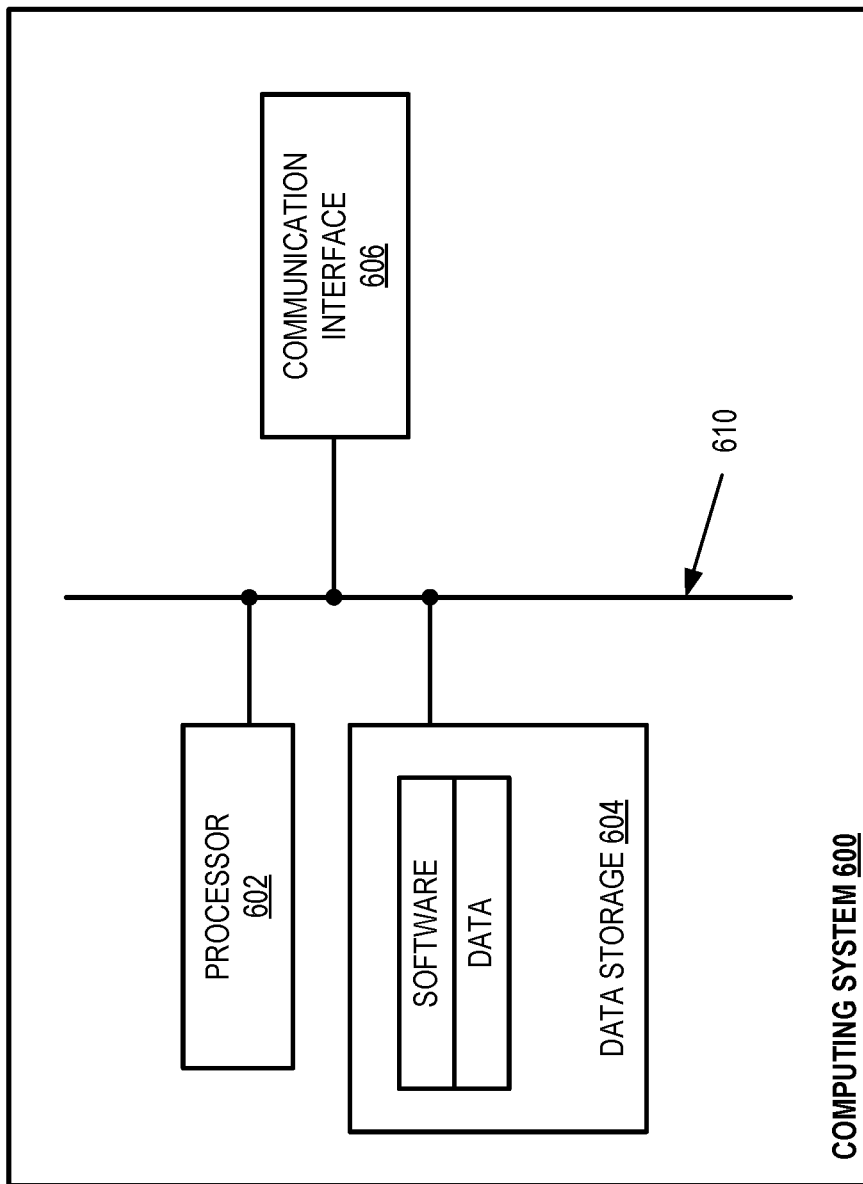
FIG. 6 is a simplified block diagram that illustrates some structural components that may be included in an example computing system.

Turning next to FIG. 6, a simplified block diagram is provided to illustrate some structural components that may be included in an example computing system 600. For example, computing system 600 may implement one or more of the software components shown in FIG. 2 and FIG. 3 (e.g., producer 302 or consumer 304) and may be configured to carry out any of the various functions disclosed herein—including but not limited to the functions included in the example data flows described with reference to FIGS. 4-5. At a high level, computing system 600 may generally comprise any one or more computer systems (e.g., one or more servers) that collectively include at least a processor 602, data storage 604, a communication interface 606, and a user interface 608, all of which may be communicatively linked by a communication link 610 that may take the form of a system bus, a communication network such as a public, private, or hybrid cloud, or some other connection mechanism. Each of these components may take various forms.

Processor 602 may comprise one or more processing components, such as general-purpose processors (e.g., a single- or a multi-core CPU), special-purpose processors (e.g., a GPU, application-specific integrated circuit, or digital-signal processor), programmable logic devices (e.g., a field programmable gate array), controllers (e.g., microcontrollers), and/or any other processor components now known or later developed. In line with the discussion above, it should also be understood that processor 602 could comprise processing components that are distributed across a plurality of physical computing devices connected via a network, such as a computing cluster of a public, private, or hybrid cloud.

In turn, data storage 604 may comprise one or more non-transitory computer-readable storage mediums that are collectively configured to store (i) program instructions that are executable by processor 602 such that the computing system 600 is configured to perform certain functions, and (ii) data that may be received, derived, or otherwise stored, for example, in one or more databases, file systems, repositories, or the like, by the computing system 600. In this respect, the one or more non-transitory computer-readable storage mediums of data storage 604 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 604 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

Communication interface 606 may take the form of any one or more interfaces that facilitate wireless and/or wired communication between computing system 600 and other systems or devices. In this respect, each such interface may take any of various forms, examples of which may include an Ethernet interface, a serial bus interface (e.g., Firewire, USB 3.0, etc.), a chipset and antenna adapted to facilitate wireless communication, and/or any other interface that provides for any of various types of wireless communication (e.g., Wi-Fi communication, cellular communication, short-range wireless protocols, etc.) and/or wired communication. Other configurations are possible as well.

The computing system 600 may additionally include or have an interface for connecting to one or more user-interface components that facilitate user interaction with the computing system 600, such as a keyboard, a mouse, a trackpad, a display screen, a touch-sensitive interface, a stylus, a virtual-reality headset, and/or one or more speaker components, among other possibilities.

It should be understood that the computing system 600 is one example of a computing system that may be used with the embodiments described herein. Numerous other arrangements are possible and contemplated herein. For instance, in other embodiments, the computing system 600 may include additional components not pictured and/or more or fewer of the pictured components.

CONCLUSION

This disclosure makes reference to the accompanying figures and several example embodiments of the disclosed innovations that have been described above. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and sprit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

We claim:

1. A computing system comprising:
a network interface for communicating over at least one data network;
at least one processor;
at least one non-transitory computer-readable medium; and
program instructions stored on the at least one non-transitory computer-readable medium that are executable by the at least one processor such that the computing system is configured to:
determine a start of a window in an unbounded stream of events produced by the computing system;
based on determining the start of the window, inject, into the unbounded stream of events, a window open sentinel that indicates one or more reconciliation rules for the window;
determine a start of a shard in the unbounded stream of events, wherein the shard is within the window;
based on determining the start of the shard, inject, into the unbounded stream of events, a shard open sentinel that indicates one or more reconciliation rules for the shard;
transmit a set of events produced within the shard;
execute the one or more reconciliation rules for the shard for a set of events produced within the shard to thereby generate one or more reconciliation attributes for the shard;
determine a close of the shard in the unbounded stream of events;
based on determining the close of the shard, inject, into the unbounded stream of events, a shard close sentinel that indicates the one or more reconciliation attributes for the shard;
execute the one or more reconciliation rules for the window for a set of events produced within the window to thereby generate one or more reconciliation attributes for the window;
determine a close of the window in the unbounded stream of events; and
based on determining the close of the window, inject, into the unbounded stream of events, a window close sentinel that indicates the one or more reconciliation attributes for the window.

2. The computing system of claim 1, wherein the computing system is a producer computing system, the producer computing system further comprising program instructions stored on the at least one non-transitory computer-readable medium that are executable by the at least one processor such that the producer computing system is configured to:
receive, from a consumer computing system, an indication that the shard was unsuccessfully reconciled; and
based on receiving the indication, retransmit the set of events produced within the shard.

3. The computing system of claim 1, further comprising program instructions stored on the at least one non-transitory computer-readable medium that are executable by the at least one processor such that the computing system is configured to:
receive, from a consumer computing system, an indication that the window was unsuccessfully reconciled; and
based on receiving the indication, retransmit the set of events produced within the window.

4. The computing system of claim 1, wherein the one or more reconciliation rules for the window comprise instructions for determining (i) a given number of events produced within the window, (ii) a given number of shards produced within the window, and (iii) a signature for each event produced within the window.

5. The computing system of claim 1, wherein the one or more reconciliation rules for the window comprise instructions for determining one or more of (i) a summation of a given event attribute across all events produced within the window, (ii) a number of a given type of event produced within the window, or (iii) a signature for each of a given type of event produced within the window.

6. The computing system of claim 1, wherein the one or more reconciliation rules for the shard comprise instructions for determining (i) a given number of events produced within the shard and (ii) a signature for each event produced within the shard.

7. The computing system of claim 1, wherein the one or more reconciliation rules for the shard comprise instructions for determining one or more of (i) a summation of a given event attribute across all events produced within the shard, (ii) a number of a given type of event produced within the shard, or (iii) a signature for each of a given type of event produced within the shard.

8. The computing system of claim 1, wherein the program instructions stored on the at least one non-transitory computer-readable medium that are executable by the at least one processor such that the computing system is configured to execute the one or more reconciliation rules for the shard for a set of events produced within the shard comprise program instructions stored on the at least one non-transitory computer-readable medium that are executable by the at least one processor such that the computing system is configured to execute the one or more reconciliation rules for the shard after all events in the set of events are produced within the shard.

9. The computing system of claim 1, wherein the program instructions stored on the at least one non-transitory computer-readable medium that are executable by the at least one processor such that the computing system is configured to execute the one or more reconciliation rules for the shard for a set of events produced within the shard comprise program instructions stored on the at least one non-transitory computer-readable medium that are executable by the at least one processor such that the computing system is configured to execute the one or more reconciliation rules for the shard after each event in the set of events is produced within the shard.

10. The computing system of claim 1, wherein the program instructions stored on the at least one non-transitory computer-readable medium that are executable by the at least one processor such that the computing system is configured to execute the one or more reconciliation rules for the window for a set of events produced within the window comprise program instructions stored on the at least one non-transitory computer-readable medium that are executable by the at least one processor such that the computing system is configured to execute the one or more reconciliation rules for the window after all events in the set of events are produced within the window.

11. The computing system of claim 1, wherein the program instructions stored on the at least one non-transitory computer-readable medium that are executable by the at least one processor such that the computing system is configured to execute the one or more reconciliation rules for the window for a set of events produced within the window comprise program instructions stored on the at least one non-transitory computer-readable medium that are executable by the at least one processor such that the computing system is configured to execute the one or more reconciliation rules for the window after each event in the set of events is produced within the window.

12. The computing system of claim 1, further comprising program instructions stored on the at least one non-transitory computer-readable medium that are executable by the at least one processor such that the computing system is configured to:
  determine the one or more reconciliation rules for the shard.

13. The computing system of claim 1, further comprising program instructions stored on the at least one non-transitory computer-readable medium that are executable by the at least one processor such that the computing system is configured to:
  determine the one or more reconciliation rules for the window.

14. The computing system of claim 1, wherein the one or more reconciliation rules for the window are different from the one or more reconciliation rules for the shard.

15. A non-transitory computer-readable medium, wherein the non-transitory computer-readable medium is provisioned with program instructions that, when executed by at least one processor, cause a computing system to:
  determine a start of a window in an unbounded stream of events produced by the computing system;
  based on determining the start of the window, inject, into the unbounded stream of events, a window open sentinel that indicates one or more reconciliation rules for the window;
  determine a start of a shard in the unbounded stream of events, wherein the shard is within the window;
  based on determining the start of the shard, inject, into the unbounded stream of events, a shard open sentinel that indicates one or more reconciliation rules for the shard;
  transmit a set of events produced within the shard;
  execute the one or more reconciliation rules for the shard for a set of events produced within the shard to thereby generate one or more reconciliation attributes for the shard;
  determine a close of the shard in the unbounded stream of events;
  based on determining the close of the shard, inject, into the unbounded stream of events, a shard close sentinel that indicates the one or more reconciliation attributes for the shard;
  execute the one or more reconciliation rules for the window for a set of events produced within the window to thereby generate one or more reconciliation attributes for the window;
  determine a close of the window in the unbounded stream of events; and
  based on determining the close of the window, inject, into the unbounded stream of events, a window close sentinel that indicates the one or more reconciliation attributes for the window.

16. The non-transitory computer-readable medium of claim 15, wherein the computing system is a producer computing system, and wherein the non-transitory computer-readable medium is also provisioned with program instructions that, when executed by at least one processor, cause the producer computing system to:
  receive, from a consumer computing system, an indication that the shard was unsuccessfully reconciled; and
  based on receiving the indication, retransmit the set of events produced within the shard.

17. The non-transitory computer-readable medium of claim 15, wherein the one or more reconciliation rules for the window comprise instructions for determining (i) a given number of events produced within the window, (ii) a given number of shards produced within the window, and (iii) a signature for each event produced within the window.

18. The non-transitory computer-readable medium of claim 15, wherein the program instructions that, when executed by at least one processor, cause the computing system to execute the one or more reconciliation rules for the shard for a set of events produced within the shard comprise program instructions that, when executed by at least one processor, cause the computing system to execute the one or more reconciliation rules for the shard after each event in the set of events is produced within the shard.

19. The non-transitory computer-readable medium of claim 15, wherein the one or more reconciliation rules for the window are different from the one or more reconciliation rules for the shard.

20. A method carried out by a computing system, the method comprising:
  determining a start of a window in an unbounded stream of events produced by the computing system;
  based on determining the start of the window, injecting, into the unbounded stream of events, a window open sentinel that indicates one or more reconciliation rules for the window;
  determining a start of a shard in the unbounded stream of events, wherein the shard is within the window;
  based on determining the start of the shard, injecting, into the unbounded stream of events, a shard open sentinel that indicates one or more reconciliation rules for the shard;
  transmitting a set of events produced within the shard;
  executing the one or more reconciliation rules for the shard for a set of events produced within the shard to thereby generate one or more reconciliation attributes for the shard;
  determining a close of the shard in the unbounded stream of events;

based on determining the close of the shard, injecting, into the unbounded stream of events, a shard close sentinel that indicates the one or more reconciliation attributes for the shard;

executing the one or more reconciliation rules for the window for a set of events produced within the window to thereby generate one or more reconciliation attributes for the window;

determining a close of the window in the unbounded stream of events; and based on determining the close of the window, injecting, into the unbounded stream of events, a window close sentinel that indicates the one or more reconciliation attributes for the window.

\* \* \* \* \*